3,244,662
POLYMERS STABILIZED BY A COMBINATION OF ORGANIC PHOSPHITES AND ORGANIC BORATES
Richard Strauss, Lexington, and James Bottomley, Tewksbury, Mass., assignors, by mesne assignments, to National Polychemicals, Inc.
No Drawing. Filed Sept. 10, 1963, Ser. No. 306,339
17 Claims. (Cl. 260—29.7)

Our invention relates to organic phosphite and organic borate compositions and to polymers containing a stabilizing amount of these compositions. In particular, our invention concerns styrene-butadiene rubber enhanced in heat stability by an organic phosphite in combination with a small amount of an organic borate.

Organic phosphites such as the $C_8$ to $C_{12}$ alkyl substituted phenyl phosphites have been widely employed as stabilizers in rubbers to inhibit or prevent the deterioration of the rubber during storage, processing, and use. Although these and other organic phosphites are effective, prolonged exposure to heat despite the presence of small amounts of the organic phosphites, often produces increased gelation of the rubber and rapid color degradation.

It is therefore an object of our invention to provide a method of enhancing the stabilizing effectiveness of a wide variety of rubber and plastic polymers containing organic phosphites.

Another object of our invention is to provide rubber polymerizates of greatly improved heat stability and increased resinification resistance.

Another object of our invention is to provide plastic and rubber polymers of excellent color stability.

Further objects and advantages of our invention will be apparent to those skilled in the art from the following detailed description of our invention.

We have found that combinations of organic phosphites and organic borates are very effective in enhancing the heat stability characteristics of rubber and plastic polymers. Our compositions improve the resistance of polymers to thermal degradation, such as in color and physical properties. Our composition may be effectively employed in solvent polymer solutions as well as in polymer emulsions. It has been discovered that even a very small amount of an organic borate in combination with an organic phosphite is more effective in stabilizing properties than the total equivalent amount of the organic phosphite alone. Further when employed in unsaturated polymers such as rubber polymerizates, the combination of an organic phosphite and an organic borate reduces the resinification (percent gel) and the subsequent loss of beneficial properties of the polymer over the equivalent amount of the organic phosphite alone. Further, our compositions even with extremely small amounts of the borate often are more effective in stabilizing than either the organic phosphite or organic borate would indicate alone.

A small amount of our compositions for example from about 0.3 to 3.0 weight percent based on the polymer is usually sufficient to stabilize the polymer. The stabilizing composition may be added directly to a solvent solution prior to precipitation or emulsified and added to the polymeric emulsion prior to coagulation or otherwise intimately mixed with the polymer to be stabilized. The organic phosphite and organic borate combinations are effective over a wide range of compositions. Excellent results have been achieved by employing a major amount of the organic phosphite and from about 2 to 50 weight percent of the organic borate. It is often desirable to employ the usual amount of the organic phosphite and to then add a very small amount of the organic borate to obtain enhanced results. Our compositions thus permit enhanced results at very low additional cost or similar stabilizing results at reduced cost by allowing less organic phosphite to be used. Of course, our compositions may be used alone or in combination with other heat and light stabilizers and antioxidants.

The organic phosphites of our composition comprise those substituted and unsubstituted aliphatic, aromatic, alicyclic, and heterocyclic organic phosphites and combinations thereof. These organic phosphites include those phosphites that have a reduced tendency to hydrolyze in water and include those organic phosphites presently used as polymeric additives and heat stabilizers. Further the organic phosphites of our invention also include those phosphites previously believed to have little or marginal stabilizing properties, since these phosphites in combination with organic borates may be converted into fair to excellent stabilizing compositions. Substituent groups in the organic phosphite may comprise halogens like chlorine, or hydroxy groups. The organic phosphite would include but not be limited to: those triesters of the type:

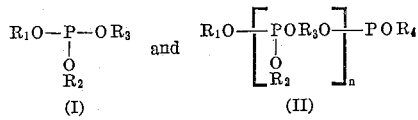

wherein $n$ is from 0 to 3, and $R_1$, $R_2$, $R_3$, and $R_4$ are organic radicals such as hydrocarbon radicals like alkyl, alkylene, cyclic alkyl aryl, alkyl substituted aryl and aryl substituted alkyl (hereinafter referred to as alkyl-aryl) and combinations thereof. For example suitable organic phosphites would include: alkyl substituted phenyl phosphites and alkyl, alkyl substituted phenyl phosphites particularly where the alkyl groups contain from 8 to 12 carbon atoms. Organic phosphites enhanced in stabilizing properties by organic borates comprise: tri (nonyl-phenyl) phosphite; octyl phenyl di (dodecyl-phenyl) phosphite; di (nonyl-phenyl) neodecyl phosphite; di (nonyl phenyl) beta naphthyl phosphite; di (neododecyl pentaerythrital) diphosphite; neo dodecyl neopentylene phosphite; di (nonyl phenyl) isodecyl phosphite; tri phenyl phosphite; tri nonyl phosphite; tri cresyl phosphite; phenyl hexylene phosphite; triethylene glycol di neo pentyl di phosphite; and the like and combinations thereof. Also included are those organic phosphites described in United States Patents 2,241,244; 2,419,354; 2,732,365; 2,733,226; 3,009,939; 3,039,993; 3,047,608; 3,053,878; 3,080,338; and 3,088,917.

The organic boron compounds of our invention comprise those organic borates or salts of boric acid having substituted or unsubstituted aliphatic, aromatic, heterocyclic and alicyclic groups and combinations thereof. The organic borates include those borates which have a reduced tendency to hydrolyze in water and include hydrocarbon soluble organic borates. The organic borates of our invention may be of the type:

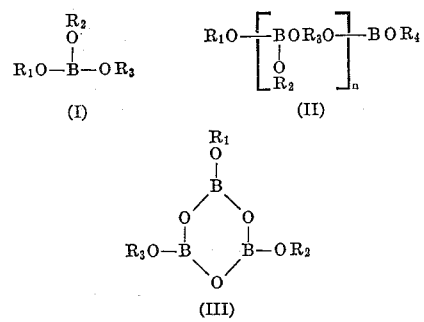

wherein $n$ is from 0 to 3, and $R_1$, $R_2$, $R_3$, and $R_4$ are organic radicals such as hydrocarbon radicals like alkyl, alkylene, cyclic alkyl aryl, alkyl substituted aryl and aryl substituted alkyl (hereinafter referred to as alkyl-aryl) and combinations thereof.

For example, suitable organic borates would include alkyl substituted aryl borates and alkyl, alkyl substituted aryl borates especially those borates where the alkyl groups are from 1 to 6 carbon atoms. Suitable borate compounds include but are not limited to: 2,6 tertiary butyl 4 methyl phenyl di butyl borate; tri (nonyl phenyl) borate; tri cresyl borate; phenyl hexylene borate; octyl phenyl di(ethyl hexyl)borate; di (nonyl phenyl) isodecyl borate; di hexylene glycol di borate; tri octyl borate; para tertiary butyl phenyl di isopropyl borate; and the like and combinations thereof.

The polymers in which our stabilizing compositions are useful include those rubbery polymerizates such as those hydrocarbon polymers of conjugated dienes and natural and synthetic elastomers capable of being cured or vulcanized as well as thermoplastic polymers which undergo color degradation upon exposure to high temperatures or low temperatures over a period of time. These rubbery polymerizates and thermoplastics resins are referred to as plastomers. Suitable elastomers would include those rubbery polymers exhibiting elastomeric properties and capable of being cured such as those derived from or containing ethylenically unsaturated carbon to carbon linkages. These polymers comprise: natural rubber, copolymers of diene and a vinyl aromatic such as styrene and a conjugated diene like butadiene; polymers of halogenated dienes like polychloroprene; copolymers of a diolefin and a mono olefin commonly referred to as butyl rubber such as containing 80 to 99.5 weight percent isobutylene and a 0.5 to 20 weight percent isoprene; halogenated butyl rubber such as chlorinated and brominated butyl rubber; polydienes such as conjugated polydienes like polybutadiene and polyisoprene; copolymers of ethylene and propylene and ter polymers thereof containing a $C_4$ to $C_{12}$ diene like dicyclopentadiene; copolymers of $C_4$–$C_{12}$ dienes and unsaturated organic nitriles such as butadiene and acrylonitrile; copolymers of dienes with vinyl-containing organic monomers and copolymers like butadiene with methyl acrylate and methyl methacrylate; ureathanes prepared by the reaction of a diisocyanate with a poly alkylene ether glycol such as polyethylene ether glycol and a polyester glycol; polysulfides; halosulfonated $C_2$–$C_3$ polyalkylenes like chlorosulfonated polyethylene; and the like and combinations thereof.

Suitable thermoplastic resins include thermoplastic vinyl resins like poly styrene and alkyl substituted polystyrenes like poly alpha methyl styrene, and vinyl halide polymers and copolymers such as poly vinyl chloride and copolymers of vinyl chloride with short chain fatty vinyl esters like vinyl acetate and with vinylidene halides and the like. Other thermoplastic polymers comprise: Polyamides like nylon; nitriles like polyacrylonitrile; acrylonitrile-butadiene-styrene copolymers; $C_2$–$C_4$ poly alkylenes like polyethylene and poly propylene; polyesters prepared by the reaction between a dibasic acid and a polyhydroxy compound like a glycol; natural and synthetic hydrocarbon and petroleum resins like terpene resins, coumarone-indene resins, and the like as well as blends of these theromplastics with low melting point waxes like paraffin and oils.

Stabilizers are usually employed in the uncured rubber or elastomers. However, the polymers may contain other additives such as accelerators, activators, fillers, curing agents, cross linking agents like divinyl benzene, antioxidants, pigments, metal oxides, carbon black, chemical blowing agents, waxes, lubricants, hydrocarbon oils, resins, fibers, dyes, plasticizers, fatty acid soaps, and the like.

The surprising advantages of our stabilizer compositions will be apparent in greater detail from the following examples:

*Example 1*

An unstabilized styrene-butadiene rubber (SBR) latex was stabilized by the addition of an emulsion containing the stabilizers of Table I. The SBR latex was a 20% solid commercial latex type 1502 prepared by a cold polymerization method, and emulsified by a fatty acid rosin mixture. The rubber contained about 23.5 weight percent styrene and had a raw Mooney viscosity of about 50.

An emulsion of each stabilizer tested was prepared by mixing 50.0 grams of the stabilizer with 2.0 grams of oleic acid, stirring the mixture and warming to 50° C. This mixture was then poured slowly into a solution of 192.5 grams of demineralized water, 0.62 gram of sodium hydroxide pellets, and 0.34 grams of oleic acid while rapidly stirring in a Waring Blendor. The stirring was continued for 10 minutes after the stabilizer was added. The pH of the stabilizer emulsion was then checked with a pH meter at 25° C. and if necessary the emulsion adjusted to a pH range of 11 to 12 with a 50% solution of sodium hydroxide. This emulsified stabilizer was then added in the desired amounts to the SBR latex.

The stabilized SBR latex was then coagulated and dried in crumb form. Coagulation was accomplished by the addition of an acid-brine solution prepared as follows:

2.1 ml. conc. $H_2SO_4$
280.0 ml. saturated NaCl solution
<u>1517.9 ml. demineralized $H_2O$</u>
1800.0 ml. of solution The acid-brine solution (1800 ml.) was warmed to 40° C. and stirred at high speed in a gallon Waring Blendor. The stabilized SBR latex (1460 grams) was stirred and warmed to 30° C. and then added as rapidly as possible from a dropping funnel to the blendor. Stirring was continued for about 15 minutes or until the temperature reached 75° C. at which time the pH was about 4–5 and the filtrate clear. The coagulated SBR acid mixture is then filtered through a Buchner funnel, and the SBR crumb washed with 2 to 3 liters of demineralized water in a Waring Blendor on high speed, for 5 to 10 minutes at a temperature of 35° C. or less. The crumb SBR is then broken up, dried in an oven at 80° C. for 8 minutes, removed, cooled, and rebroken in the blendor. The crumb material is further dried for 10 minutes at 80° C. again cooled and broken up and left to complete drying at room temperature overnight.

The stabilized SBR crumb was then heat aged by placing samples in aluminum foil lined paper cups and aged at 100° C. for 0, 12, 24, and 48 hours. At the end of each test period the crumb was visually observed and examined for color degradation. The sample was then numerically rated according to the following color standard:

Color rating:                                    Color observed
1 ------------------ White.
2 ------------------ Yellow white.
3 ------------------ Tan white.
4 ------------------ Light-brown-slight red shade.
5 ------------------ Brown-dark red shade.
6 ------------------ Dark reddish brown.

The higher numerical rating or the darker the color after heat ageing the less effective and acceptable is the stabilizer being tested.

Additionally, the samples were tested after heat ageing for the percent insoluble in benezene (percent gel), since gel buildup indicates resinification of the polymer and the relative effectiveness of the stabilizer in preventing or inhibiting the degradation of the beneficial properties of the polymer.

The gel test procedure used was as follows:

A representative sample of 0.900 gram is weighed with all samples done in duplicate. About 210 ml. of benzene are added to the sample in a jar and the screw cap put on. The jar is allowed to stand for 24 hours. After 24 hours, the jar is shaken vigorously by hand for 30 seconds and allowed to settle for 2 hours. An 80 mesh wire basket is then lowered into the jar and 70 ml. of benzene solution is removed from the basket by pipette. The 70 ml. portion of benzene solution is placed in a weighed jar and evaporated to dryness, cooled and weighed. Calculations:

$$\frac{\text{Original weight of sample} - (3 \text{ times weight of dried sample})}{\text{Original weight of sample}}$$

$\times 100 = $ percent gel

The results of the heat age tests for percent gel and color degradation with various stabilizers is as shown in Table I.

added, and then heated to drive off the benzene and precipitate the stabilized polymer.

The solvent precipitation method was carried out by stirring twenty grams of the unstabilized dried SBR crumb into 500 ml. of benzene until the crumb dissolved.

The stabilizer to be tested is dissolved in 25 ml. of benzene and the solution is added to the dissolved crumb and stirred a few minutes. The benzene solution is then poured into aluminum foil lined cake pans and placed in an oven at 55–60° C. until dry (about 15 hours). The rubber is then easily peeled off the aluminum foil and is ready for heat aging tests.

These samples were then heated at 100° C. for the specified time periods and rated for color degradation. The results of these tests are summarized in Table II.

TABLE I

| Test No. | Stabilizer | Weight Percent | Time in Hours at 100° C. | | | | | | | |
|---|---|---|---|---|---|---|---|---|---|---|
| | | | 0 hrs. | | 12 hrs. | | 24 hrs. | | 48 hrs. | |
| | | | Percent Gel | Percent Color | Percent Gel | Percent Color | Percent Gel | Percent Color | Percent Gel | Percent Color |
| 1 | Tris nonyl phenyl phosphite | 1.25 | 0.2 | 1 | 13.0 | 2 | 11.2 | 3 | 25.4 | 4 |
| 2 | Tris nonyl phenyl phosphite 2,6, tert. butyl 4-methyl phenyl dibutyl borate. | 1.25 / 0.70 | 0 | 1 | 2.0 | 1 | 3.1 | <2 | 3.1 | <2 |
| 3 | Tris nonyl phenyl phosphite 2,6, tert. butyl 4 methyl phenyl dibutyl borate. | 0.80 / 0.45 | 0 | 1 | 0 | 1 | 0.5 | <2 | 0.2 | 2 |
| 4 | 2,6 tert. butyl 4 methyl phenyl dibutyl borate | 1.25 | 0 | 1 | 1.1 | 1 | 2.7 | <2 | 3.9 | <4 |
| 5 | Bis nonyl phenyl isodecyl phosphite | 1.25 | .5 | 1 | 10.8 | 3 | 12.1 | 4 | 35.3 | 6 |
| 6 | Bis nonyl phenyl isodecyl phosphite 2,6 tert. butyl 4 methyl phenyl dibutyl borate. | 1.00 / 0.25 | .6 | 1 | 2.6 | 1 | 10.6 | <2 | 20.8 | 4 |
| 7 | Bis nonyl phenyl isodecyl phosphite 2,6 tert. butyl 4 methyl phenyl dibutyl borate. | 1.15 / 0.10 | .3 | 1 | .7 | 1 | 7.8 | <2 | 29.6 | 3 |
| 8 | Tris nonyl phenyl phosphite 2,6 tert. butyl 4 methyl phenyl dibutyl borate. | 1.19 / 0.06 | .8 | 1 | .2 | <2 | .6 | <2 | 2.0 | <2.0 |

From the above results of Table I, it is seen that combinations of borate ester and an organic phosphite are a far more effective stabilizer than the phosphite alone. Moreover, although the borate ester alone is a more effective stabilizer than the phosphite alone, the phosphite-borate is superior to the borate alone. The phosphite-borate combination is an effective stabilizer even when the borate comprises only 5 weight percent of the total stabilizer composition.

Further the borate ester and the organic phosphite are exceptionally effective in inhibiting both color degradation and gel buildup. For example the tris (nonyl phenyl) phosphite is considerably enhanced in stabilizing properties by even very small amounts of an organic borate at the equivalent additive level. The combination of the di (alkyl substituted phenyl) alkyl phosphite and the tri (alkyl substituted phenyl) phosphite with the mono (alkyl substituted phenyl) di alkyl borate was very effective.

In a second series of tests, the same SBR latex was coagulated and dried without prior stabilizer addition. The crumb was then dissolved in benzene, stabilizer

TABLE II

| Stabilizer | Weight Percent | Time in Hours at 100° C. | | | |
|---|---|---|---|---|---|
| | | 0 hrs. | 12 hrs. | 24 hrs. | 48 hrs. |
| Tris nonyl phenyl phosphite | 1.25 | 1 | 2 | 3 | 4 |
| Tris nonyl phenyl phosphite 2,6 tert. butyl 4 methyl phenyl dibutyl borate. | 0.80 / 0.45 | 1 | 1 | <2 | <2 |
| Tris nonyl phenyl phosphite tri meta, para cresyl borate. | 0.83 / 0.42 | 1 | <2 | <2 | 3 |

These data show that other phosphite and organic borate combinations are effective stabilizers, and that the combination is more effective than the phosphite alone.

*Example 3*

Unstabilized polystyrene was stabilized by the addition of a conventional organic phosphite and then with an organic phosphite organic borate composition. The stabilized polystyrene was heated at about 150° C. for the specified time period and the color of the samples observed. The data is as shown on Table III.

TABLE III

| Test No. | Stabilizer | Weight Percent | Time in Hours at 150° C. | |
|---|---|---|---|---|
| | | | 0 hrs. | 8 hrs. |
| 1 | Tris nonyl phenyphosphite | 3.0 | Colorless, Clear | Dark yellow. |
| 2 | Tris nonyl phenyl phosphite 2,6 tert. butyl 4 methyl phenyl dibutyl borate. | 2.0 / 1.0 | Colorless, Clear | Colorless, Clear. |

The polystyrene used was a medium impact type with a specific gravity of 1.05 and a heat distortion temperature of 90° C. by ASTM method D648–45T.

The above data demonstrates the effectiveness of the borate-phosphite mixture in stabilizing a thermoplastic resin in which with a conventional stabilizer there was severe color degradation in only 8 hours.

*Example 4*

A precipitated polybutadiene rubber is enhanced in heat stability by the addition of about 1.5 weight percent of a tricresyl phosphite and 0.5 weight percent of a para tertiary butyl phenyl di isopropyl borate to a hydrocarbon solvent solution of the polybutadiene.

*Example 5*

An acrylonitrile-butadiene rubbery polymer is inhibited against color changes and gel buildup by the addition of a 1.0 weight percent of tri ethylene glycol di neopentyl di phosphite and 0.20 weight percent of 2.6 tert butyl 4 methyl phenyl di isopropyl borate.

*Example 6*

A sample of polyethylene, molecular weight approximately 10,000, melt index 200, specific gravity 0.914, was placed in an aluminum dish and melted on a hot plate. To another sample of the same material, approximately 1.0% tris nonylphenylphosphite and 0.5% 2,6-tertiary-butyl-4-methylphenyldibutyl borate was added. Both samples were kept molten on the hot plate for 30 minutes. At the end of that time, the untreated polyethylene had turned lemon yellow, while the treated material was only slightly discolored.

*Example 7*

A sample of a saturated polyester resin of ethyleneglycol, terephthalic acid and isophthalic acid such as described in U.S. Patent 2,965,613, with a ball-and-ring softening point of 140° C., was placed in an aluminum dish and melted on a hot plate. To another sample of the same material, approximately 1.0% trisnonylphenylphosphite and 0.5% 2,6-tertiarybutyl-4-methylphenyldibutylborate was added. Both samples were kept molten for one hour. At the end of that time, the untreated polyester had turned yellow-brown, while the treated material was light yellow.

*Example 8*

A sample of the same polyethylene used in Example 6 was placed in an aluminum dish and melted on a hot plate. To another sample of the same material, approximately 1.0% of tridecylphosphite and 0.5% of trinonylphenylborate was added. Both samples were kept molten for 90 minutes. At the end of that time, the untreated polyethylene had turned lemon yellow with some browning, while the treated material was a light tan.

*Example 9*

A sample of the polyethylene used in Example 6 was intentionally contaminated with a trace of ferric chloride, to represent possible impurities which could be introduced in processing. Two other samples were contaminated in the same manner. To one, approximately 1.0% trisnonylphenylphosphite was added, while to the other approximately 1.0% trisnonylphenylphosphite and 0.5% 2,6-tertiarybutyl-4-methylphenyldibutyl borate was added. After being kept molten for approximately 15 minutes, the sample without additives was yellow-brown. The sample with only the phosphite was white with some tan discoloration, while the sample containing the phosphite and the borate was white.

The stabilizer compositions of our invention may be prepared in emulsion form by the emulsification of the composition in water with an emulsifier such as fatty acid alkali metal soap, or homogenzied or otherwise placed in the emulsion form. Also, the compositions may be dissolved in hydrocarbon solvents like petroleum solvents, toluene, plasticizers like fatty acid esters, phthalate esters, etc., for addition to a solvent or oil solution or plasticized plastomer such as in a mixer, solution, etc. The amount of the stabilizer in the solution or emulsion will depend upon the amount required for stabilization.

Our invention then permits more effective stabilization of rubbery and thermoplastic polymers. The addition of even very small quantities of the organic borate was shown to yield enhanced stabilizing effectiveness to organic phosphite containing polymers. Our compositions inhibited color degradation and prevented gel build up. Our invention permits organic phosphites previously ineffective or of marginal stability effectiveness to be reevaluated and employed in combination with our borate esters. Our invention thus reduces stabilizing costs and considerably widens the use of organic phosphites as stabilizers, promotes more effective stabilization, and permits lower stabilizer concentrations to be used.

What we claim is:

1. A natural or synthetic elastomeric conjugated diene polymerizate subject to degradation and stabilized with from about 0.3 to 3.0 percent by weight of a stabilizing composition comprising an organic phosphite and an organic hydrocarbon-substituted borate, the borate being present in an amount of about 2 to 50 percent by weight of the stabilizing composition.

2. The polymerizate of claim 1 wherein the organic phosphite is a tris hydrocarbon-substituted phosphite.

3. The polymerizate of claim 1 wherein the borate is a tris hydrocarbon-substituted borate.

4. The polymerizate of claim 1 wherein the borate is a tris alkyl-substituted phenyl borate.

5. The polymerizate of claim 1 wherein the borate is a mixed alkyl-substituted phenyl-alkyl borate.

6. The polymerizate of claim 1 wherein the borate is tris alkyl borate.

7. The polymerizate of claim 1 wherein the polymerizate is selected from the group consisting of natural rubber, copolymers of butadiene and stryene, copolymers of acrylonitrile and butadienes, copolymers of butadiene and acrylate, ethylene-propylene diene modified terpolymers, polybutadiene, polyisoprene and blends thereof.

8. The polymerizate of claim 1 wherein the organic phosphite is a tris $C_8$–$C_{12}$ alkyl-substituted phenyl phosphite and the organic borate is a mixed $C_1$–$C_4$ alkyl-substituted phenyl-alkyl borate.

9. The polymerizate of claim 1 wherein the phosphite is trisnonyl phenyl phosphite and the borate is 2,6-tertiary butyl 4-methyl phenyl-dialkyl borate.

10. A rubbbery butadiene-styrene polymerizate stabilized with from 0.3 to 3.0 percent by weight of a stabilizing composition of tris $C_8$–$C_{12}$ alkyl-substituted phenyl phosphite and a 2,6 tertiary butyl 4-methyl phenyl dialkyl borate, the borate being present in an amount of from about 2 to 50 percent by weight of the stabilizing composition.

11. The polymerizate of claim 10 wherein the phosphite is trisnonylphenyl phosphite and the borate is 2,6 tertiary butyl-4-methyl phenyl-dibutyl borate.

12. An aqueous emulsion of a rubbery conjugated diene polymerizate stabilized with from about 0.3 to 3.0 percent by weight, based on the polymerizate, of a stabilizing composition comprising an organic phosphite and a tris hydrocarbon-substituted borate, the borate being present in an amount of from about 2 to 50 percent by weight of the stabilizing composition.

13. A method of enhancing the resistance to resinification or color change of a natural or synthetic elastomeric conjugated diene polymerizate stabilized with an organic phosphite, which method comprises adding to the phosphite-containing polymerizate a small amount of an organic borate sufficient to enhance the stabilization of the polymerizate.

14. The method of claim 13 wherein the borate is a mixed alkyl-substituted phenyl-alkyl borate.

15. The method of claim 13 wherein the organic phosphite is trisnonylphenyl phosphite.

16. The method of claim 13 wherein the organic borate is added in an amount of from about 2 to 50 percent by weight of the total phosphite and borate in the polymerizate.

17. The method of claim 13 wherein the polymerizate is a rubbery copolymer of butadiene and styrene, the phosphite is trisnonylphenyl phosphite and the borate is a tris hydrocarbon-substituted borate which contains a $C_1$–$C_4$ alkyl-substituted phenyl radical.

References Cited by the Examiner

UNITED STATES PATENTS

| 3,131,164 | 4/1964 | Doyle et al. | 260—45.7 |
| 3,177,267 | 4/1965 | Luvisi | 260—45.7 |

FOREIGN PATENTS

| 450,283 | 8/1948 | Canada. |

LEON J. BERCOVITZ, *Primary Examiner.*

DONALD E. CZAJA, *Examiner.*

MAURICE J. WELSH, *Assistant Examiner.*